US006401666B1

(12) United States Patent
Kircher

(10) Patent No.: US 6,401,666 B1
(45) Date of Patent: Jun. 11, 2002

(54) ADJUSTABLE LEASH CONTROLLED STRAIN REDUCING ANIMAL HARNESS

(76) Inventor: Paul J. Kircher, 10450 Barton Rd., Waterford, PA (US) 16441

( * ) Notice: Subject to any disclaimer, the term of this patent is extended or adjusted under 35 U.S.C. 154(b) by 0 days.

(21) Appl. No.: 09/686,395

(22) Filed: Oct. 9, 2000

Related U.S. Application Data

(60) Provisional application No. 60/173,116, filed on Dec. 27, 1999.

(51) Int. Cl.[7] ............................................. A01K 27/00
(52) U.S. Cl. ............................. 119/792; 119/793; 54/24
(58) Field of Search ............................... 119/792, 769, 119/793, 795, 856, 863; 54/71, 24, 19.1

(56) References Cited

U.S. PATENT DOCUMENTS

| | | | |
|---|---|---|---|
| 5,511,515 A | 4/1996 | Brown et al. | 119/771 |
| 5,682,840 A | 11/1997 | McFarland | 119/856 |
| 5,713,308 A | 2/1998 | Holt, Jr. | 119/856 |
| 5,743,216 A | * 4/1998 | Holt, Jr. | 119/793 |
| 5,893,339 A | 4/1999 | Liu | 119/792 |
| 5,911,200 A | 6/1999 | Clark | 119/864 |
| 5,934,224 A | 8/1999 | Sporn | 119/792 |

FOREIGN PATENT DOCUMENTS

GB  2201874  * 9/1988

* cited by examiner

Primary Examiner—Charles T. Jordan
Assistant Examiner—Judith A. Nelson
(74) Attorney, Agent, or Firm—Webb Ziesenheim Logsdon Orkin & Hanson, P.C.

(57) ABSTRACT

An animal harness is formed from a length of rope and includes a leash loop closed with a first rope locking mechanism, a top connecting line which terminates at a second rope locking mechanism, a shoulder loop, and a bottom connecting line which terminates at another rope locking mechanism. A girth loop is included in the animal harness. A method of restraining an animal includes placing the animal harness on the animal such that the girth loop encompasses the animal's torso just behind the chest of the animal. The animal's head is placed through the shoulder loop and the leash loop and a leash is attached to the leash loop. When the leash is pulled, the girth loop tightens around the abdomen of the animal which produces an instinctive submissive response and the animal ceases to pull against the leash.

20 Claims, 3 Drawing Sheets

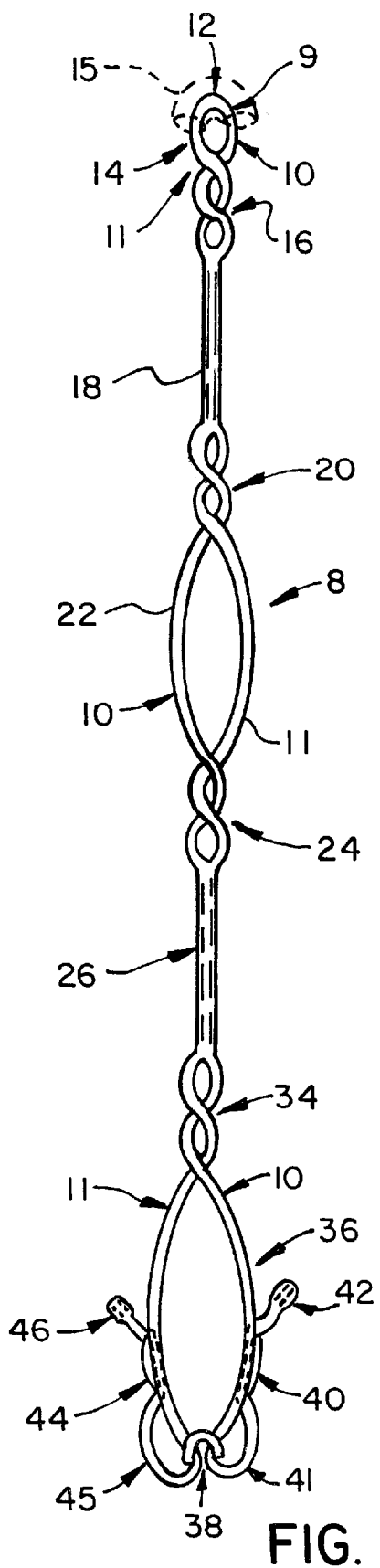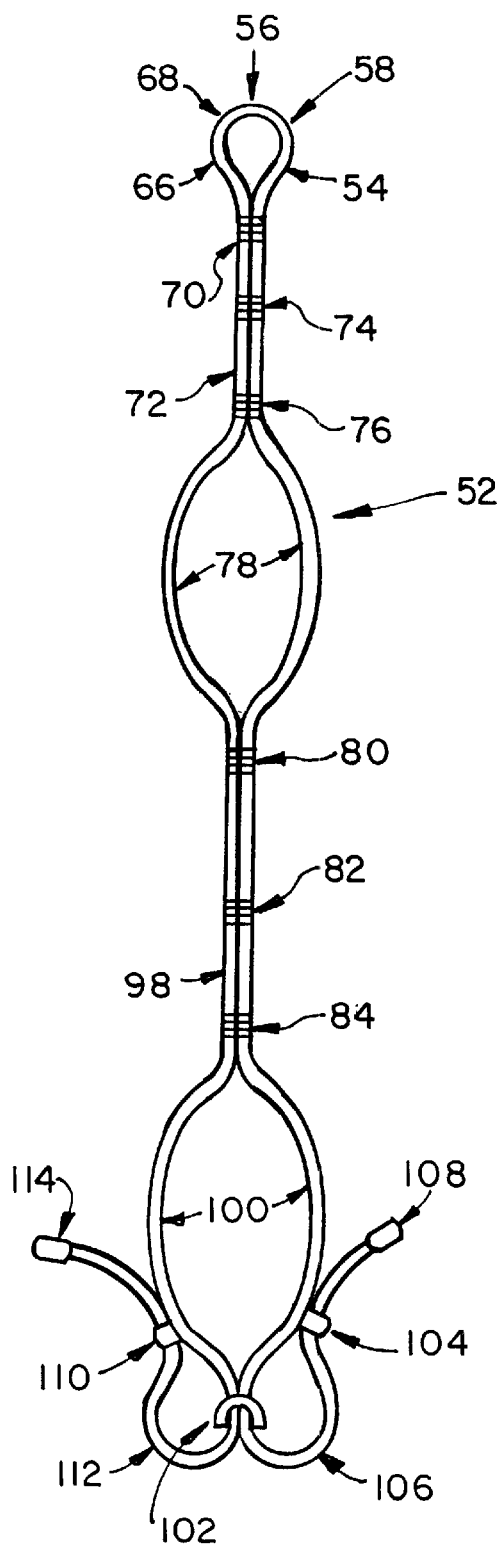

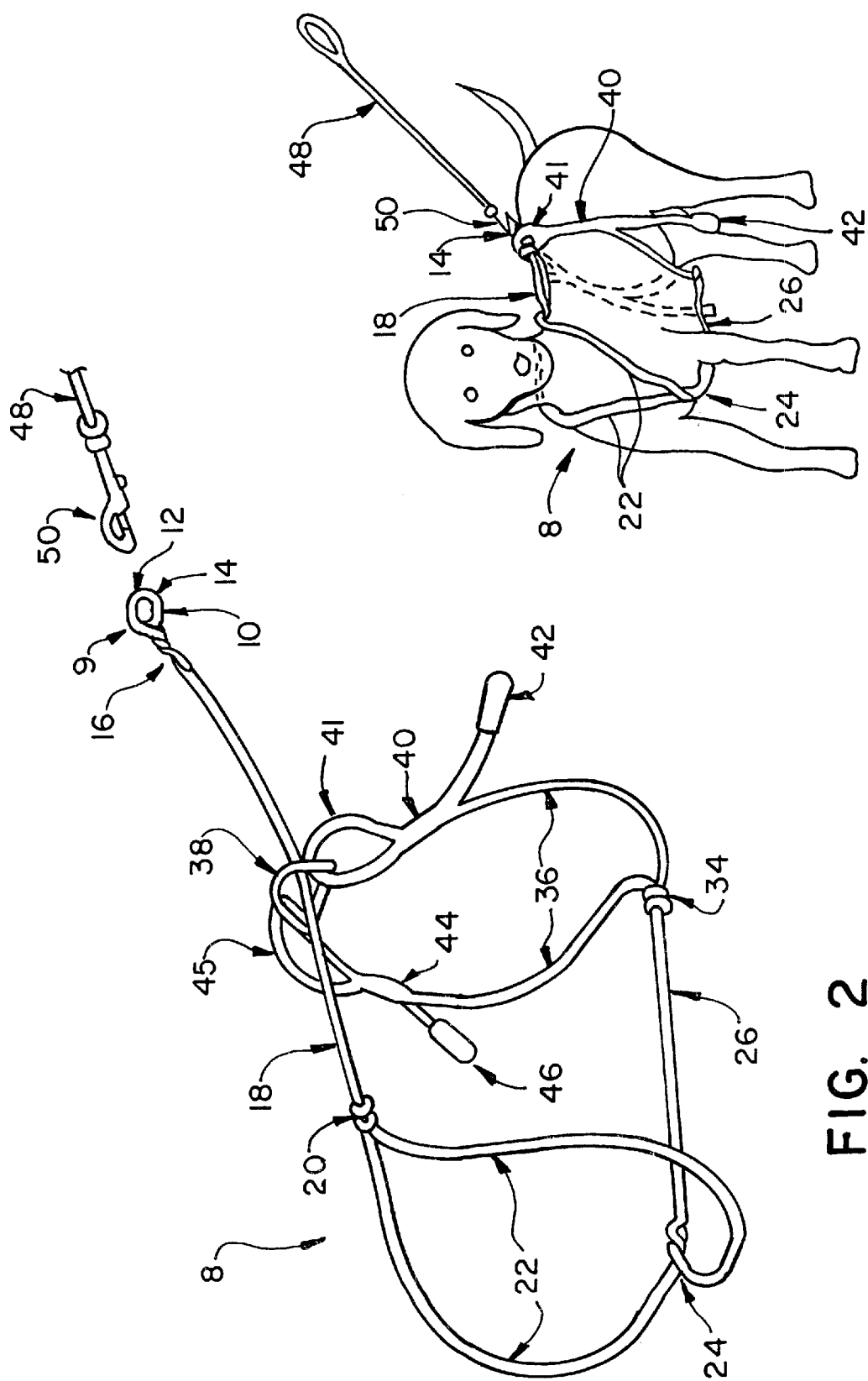

ADJUSTABLE LEASH CONTROLLED STRAIN REDUCING ANIMAL HARNESS

CROSS-REFERENCE TO RELATED APPLICATION

This application claims priority from U.S. Provisional Patent Application Ser. No. 60/173,116, filed Dec. 27, 1999 and entitled "Adjustable Leash Controlled Strain Reducing Animal Harness". The disclosure of that provisional patent application is incorporated herein by reference in its entirety.

BACKGROUND OF THE INVENTION

1. Field of the Invention

This invention relates to animal harnesses that are used to restrain animals, such as those used for domestic pets in conjunction with a leash. More particularly, this invention relates to a girth tightening harness which, when a strain is brought upon the leash due to pulling by the animal, tightens around the animal, behind its chest cavity, causing the animal to cease the pulling behavior in order to relieve the tightness.

2. Description of the Prior Art

For many years, it has been known to use harnesses on domestic pets, such as cats or dogs, for the purpose of restraining or controlling the animal. Such harnesses include simple neck collars, and also more elaborate body harnesses which are typically fitted around the animal's chest as well as around the neck.

More recently, it has been known to use harnesses and collars which function in response to undesirable behavior by the animal so as to discourage such behavior. For example, one such undesirable behavior is that of pulling or tugging by the animal when the animal is restrained on a leash. Many dog owners, for example, find such behavior to be particularly problematic when walking dogs, especially of larger breeds. Attempts to discourage such behavior have included simple choke collars, which tighten around the animal's neck when the animal strains against the leash. However, choke collars tend to cause damage to the dog's trachea and can therefore be quite dangerous to the dog.

Conventional collars, i.e., collars that are fitted around the animal's neck, have a deficiency in that many animals are able to slip their head through the collar whereby they are no longer restrained.

In order to overcome the problems associated with collars, various harnesses have been developed. For example, U.S. Pat. No. 5,511,515 to Brown et al. discloses a harness that fits over an animal's head, and buckles around its chest behind the front legs. The harness is designed such that, as the animal tries to walk faster or pull faster than the person walking the animal walks, the straps around the dog's legs pull back perpendicular to the dog's legs preventing the animal from walking faster than the person walking the dog. The harness is designed to restrict the movement of the dogs front legs by the force of the dogs own pulling power. The more the dog tries to pull, the less movement the dog has in his front legs. This harness, although effective at restraining the animal, does not work to inhibit the undesirable behavior and instead merely frustrates the animal.

U.S. Pat. No. 5,893,339 to Liu discloses a harness having a collar which is mounted on a dog's neck and a loop passing around the dog's body. This harness, because it includes a collar portion, can damage the dog's neck as discussed above.

U.S. Pat. No. 5,682,840 to McFarland discloses an animal harness that includes a pair of equal length cords adapted to form loops that are disposed within the foreleg pits of the animal. This harness can optionally include a collar. The harness reacts to the animal straining against a person holding a leash attached to the harness, which results in pressure being applied to the foreleg pits of the animal. The resulting pain causes the animal to cease the tugging behavior. However, overuse of pressure to the foreleg pits of the animal can damage the animal's muscles and tendons in that part of its body.

U.S. Pat. No. 5,713,308 to Holt discloses a collarless animal harness that overcomes some of the problems discussed above. This harness restrains the animal by cinching around the animal's chest, causing the animal to cease the straining behavior to relieve the cinching discomfort. Although the animal will cease the straining behavior in order to relieve the tightness around its chest, the animal's instincts will cause him to display the behavior again.

U.S. Pat. No. 5,911,200 discloses a harness with a single back closure and a chest strap that travels around the chest of an animal and attaches at each end to midriff straps. This harness does little to discourage undesirable behavior from the animal.

U.S. Pat. No. 5,934,224 to Spom discloses a leash-controllable, collarless dog harness adapted to inhibit a dog from straining against the leash. When the dog strains to pull on the harness, branches of the harness ride up the foreleg crotches of the dog to engage and press against the sensitive foreleg pits. The dog, in order to relieve this pressure, is induced to slow down or come to a halt. As mentioned above, overuse of pressure to the foreleg pits of the animal can damage the animal's muscles and tendons.

There remains a need to provide a leash controlled, collarless animal harness that can be used to control the behavior of an animal without causing undue pain and/or injury to the animal.

SUMMARY OF THE INVENTION

The present invention is directed to a collarless animal harness, used in conjunction with a leash, for restraining an animal by effectively discouraging pulling or tugging by the animal against the leash. The animal harness of the present invention is adjustable and easily fitted on the animal as well as being inexpensive to manufacture using known manufacturing techniques.

In general, an animal harness is adapted to fit on the body of an animal and can be connected to a leash for restraining the animal. Means for cinching the harness around the animal's body when the animal strains against the leash is also provided, such that the cinching of the harness stimulates the animal to submissively cease straining against the leash.

More specifically, the animal harness of the present invention is formed from a length of rope with an approximate midpoint from which a first rope segment and a second rope segment extend. A leash loop is formed at the approximate midpoint of the rope and is closed with a first rope locking means. The first rope segment and the second rope segment are joined together by the first rope locking means to form a top connecting line which terminates at a second rope locking means. A shoulder loop is defined by the second rope locking means, a portion of the first rope segment, a portion of the second rope segment and a third rope locking means. The first rope segment and the second rope segment are joined together by the third rope locking means to form a bottom connecting line which terminates at a fourth rope locking means. A girth loop, designed to encompass a portion of an animals body just behind the animal's chest, is defined by the fourth rope locking means, a portion of the first rope segment, a portion of the second rope segment and a ring. A portion of the first rope segment passes through the ring and is attached to the portion of the first rope segment in the girth loop using a first adjustment means to form a first rope segment adjustment loop. A portion of the second rope segment passes through the ring and is attached to the portion of the second rope segment in the girth loop using a second adjustment means to form a second rope segment adjustment loop. A portion of the first rope segment extends from the first adjustment means and is terminated by a first rope stop. A portion of the second rope segment extends from the second adjustment means and is terminated by a second rope stop.

The present invention is also directed to a method of restraining an animal. The method for restraining an animal includes placing the above-described animal harness on the animal such that the girth loop encompasses the animal's torso, just behind the chest of the animal. The animal's head is placed through the shoulder loop and the leash loop and a portion of the top connecting line are passed through the ring. A leash is attached to the leash loop. When the leash is pulled, the girth loop tightens around the abdomen of the animal which produces an instinctive submissive response and the animal ceases to pull against the leash.

BRIEF DESCRIPTION OF THE DRAWINGS

FIG. 1 is a plan view of an animal harness according to the present invention;

FIG. 2 is a perspective view of an animal harness according to the present invention;

FIG. 4 is a perspective view of an animal harness according to the present invention fitted on a dog in quartering view and being engaged by a leash; and FIG. 5 is a plan view of an animal harness according to the present invention.

DESCRIPTION OF THE PREFERRED EMBODIMENTS

Figure 3:
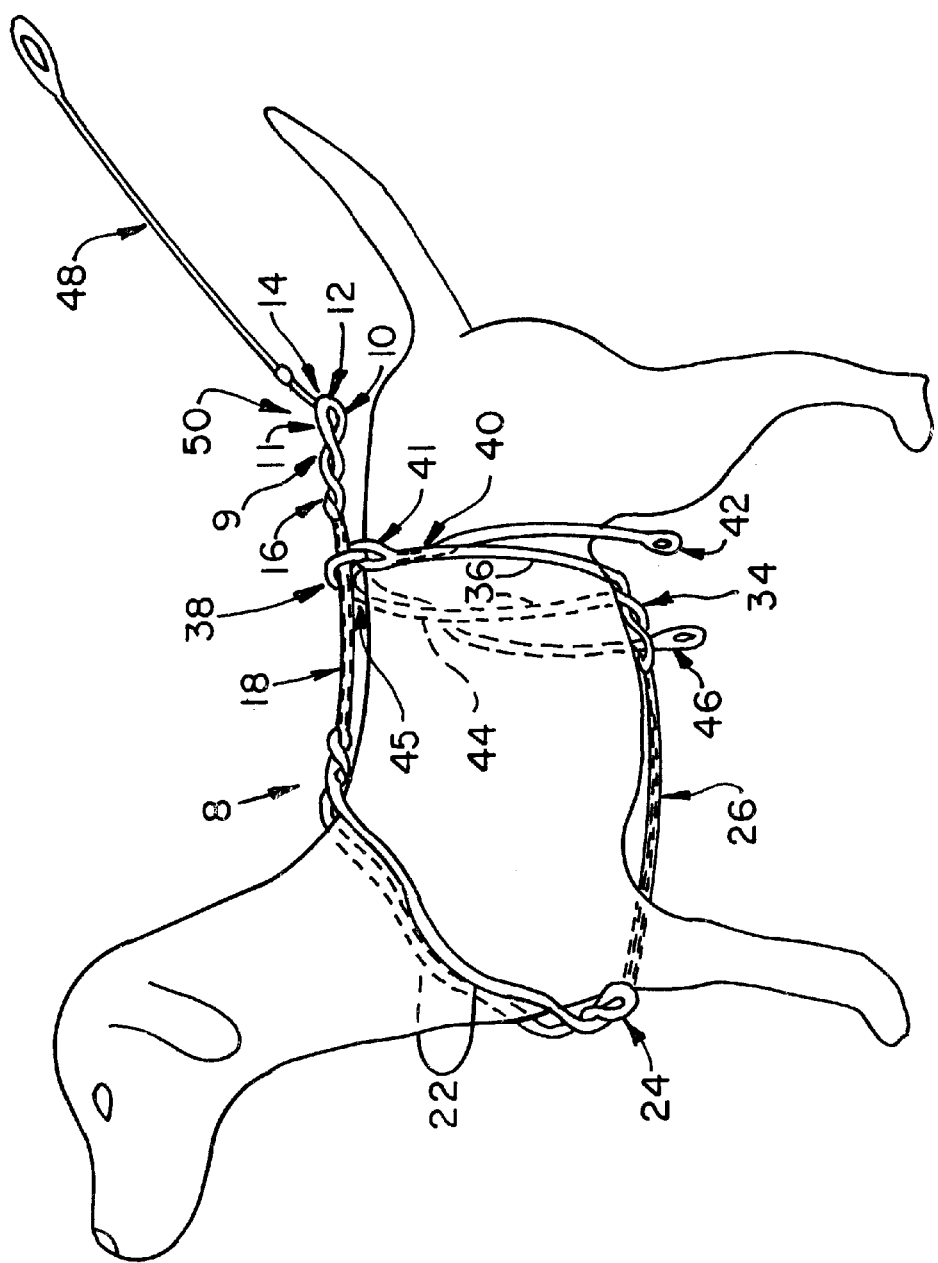
FIG. 3 is a perspective view of an animal harness according to the present invention fitted on a dog in side view and being engaged by a leash.

The adjustable leash controlled strain reducing rope animal harness of the present invention is an assembly that includes a rope and a ring. The animal harness of the present invention can be used on all types of quadruped animals, including members of the canis genus, such as *canis familiaris* or dog; members of the familyfelidae, which includes the genusfelis, such as *felis catus* or cat; members of the family leporidae, which includes rabbits and hares; members of the family equidae which includes horses; members of the family ursidae, which includes bears; members of the family camelidae, which includes llamas and camels; and members of the family bovidae, which includes sheep, goats, bison and cattle as well as pot belly pigs.

Referring to FIG. 1, an animal harness 8 of the present invention is formed from a length of rope 9 with an approximate midpoint 12 from which a first rope segment 10 and a second rope segment 11 extend. A leash loop 14 is formed at the approximate midpoint 12 of the rope 9 and is closed with a first rope locking means 16. A leash loop sleeve 15, shown in phantom, can be placed over leash loop 14 to reduce wear and tear. The first rope segment 10 and the second rope segment 11 are joined together by the first rope locking means 16 to form a top connecting line 18 which terminates at a second rope locking means 20. A shoulder loop 22 is defined by the second rope locking means 20, a portion of the first rope segment 10, a portion of the second rope segment 11 and a third rope locking means 24. The first rope segment 10 and the second rope segment 11 are joined together by the third rope locking means 24 to form a bottom connecting line 26 which terminates at a fourth rope locking means 34. A girth loop 36, designed to encompass a portion of an animal's body just behind the animal's chest, is defined by the fourth rope locking means 34, a portion of the first rope segment 10, a portion of the second rope segment 11 and a ring 38. A portion of the first rope segment 10 passes through the ring 38 and is attached to the portion of the first rope segment 10 in the girth loop 36 using a first adjustment means 40 to form a first rope segment adjustment loop 41. A portion of the second rope segment 11 passes through the ring 38 and is attached to the portion of the second rope segment 11 in the girth loop 36 using a second adjustment means 44 to form a second rope segment adjustment loop 45. A portion of the first rope segment 10 extends from the first adjustment means 40 and is terminated by a first rope segment stop 42. A portion of the second rope segment 11 extends from the second adjustment means 44 and is terminated by a second rope segment stop 46.

As used herein, rope refers to any rope, cord, twine or cable that is made from intertwining smaller fibers. The rope used in the adjustable leash controlled strain reducing rope animal harness of the present invention can be any suitable rope for use with an animal. The rope can be of any suitable construction, for example, braid-on-braid or double braid construction wherein two braided ropes are combined into one rope; hollow braid, maypole braid or diamond braid construction wherein the rope is constructed of 8, 12, or 16-carrier or strands with a hollow center; solid braid construction wherein the rope has a lock-stitch construction; and twisted rope or laid construction, which is a three-strand construction. The rope can be made from natural fibers such as cotton, hemp, manila, sisal, wool or any suitable organic fiber. Alternatively, synthetic fibers can be used. Suitable synthetic fibers that can be used in the rope 9 of the present invention include filament polypropylenes; multifilament polypropylenes; filament polyesters; polyesters such as DACRON® and MYLAR® by DuPont; polyamides, such as nylon, an example of which is TACTEL® by DuPont; polyethylenes, such as SPECTRA® by Allied Signal Corporation; aramid fibers, such as KEVLAR® by DuPont, polymetaphenylene diamine fibers, such as NOMEX® by DuPont; polyimide matrix fibers, such as POLYBON® by DuPont; and other commercially available synthetic fibers such as VECTRAN® by CNA Holdings, Inc. A preferred rope, as shown in FIG. 1, is a hollow braid 16 carrier rope made of filament polypropylene, multifilament polypropylene, filament polyester, polyester, or polyamide.

The rope locking means 16, 20, 24 and 34 can include any suitable method that prevents first rope segment 10 and second rope segment 11 from sliding or moving through the locking point. Suitable means for locking rope segments in place include a termination back splice, hard lock splice, knots, sewing, stitching, seizing, clamping, and buckling. The preferred rope locking means are a termination back splice and a hard lock splice. The rope locking means 16, 20, 24 and 34 in FIG. 1 are shown where rope 9 is a hollow braid 16 carrier rope and a hard lock back splice first rope locking means 16 is achieved by passing first rope segment 10 through second rope segment 11, followed by passing second rope segment 11 through first rope segment 10. Hard lock back splice second rope locking means 20 is achieved by passing second rope segment 11 through first rope segment 10, followed by passing first rope segment 10 through second rope segment 11. Hard lock back splice third rope locking means 24 is achieved by passing first rope segment 10 through second rope segment 11, followed by passing second rope segment 11 through first rope segment 10. Hard lock back splice fourth rope locking means 34 is achieved by passing second rope segment 11 through first rope segment 10, followed by passing first rope segment 10 through second rope segment 11. By alternating the rope segment used to begin a splice, the essentially equal length rope segments 10 and 11 maintain their essentially equal length along the animal harness 8.

Top connecting line 18 and bottom connecting line 26 can be constructed in any manner that maintains the respective portions of first rope segment 10 and second rope segment 11 aligned parallel and stationary against each other. For example, in FIG. 1, top connecting line 18 is constructed by inserting first rope segment 10 into the center of the hollow braid second rope segment 11 at the termination of first rope locking means 16. First rope segment 10 runs through the center of second rope segment 11 from first rope locking means 16, exiting second rope segment 11 just prior to second rope locking means 20. Bottom connecting line 26 is constructed by inserting second rope segment 11 into the center of the hollow braid first rope segment 10 at the termination of third rope locking means 24. Second rope segment 11 runs through the center of first rope segment 10 from third rope locking means 23, exiting first rope segment 10 just prior to fourth rope locking means 34. Alternatively, the portions of first rope segment 10 and second rope segment 11 in connecting lines 18 and 26 can be held parallel to each other. By appropriately designing the rope locking means 16, 20, 24 and 34, connecting lines 18 and 26 can be held secure. Additional holding means can be used along the length of connecting lines 18 and 26 to hold them in place. Examples of additional holding means include knots, sewing, stitching, seizing, clamping, and buckling.

The ring 38 can be any type of device that will allow first rope segment 10, second rope segment 11 and leash loop 14 along with top connecting line 18 to pass through. Examples of acceptable devices include an O ring, a D ring, or a continuous loop of rope. Ring 38 can be made from any suitable material such as metal, plastic, composite materials or any type of rope as detailed above.

Rope segment stops 42 and 46 are used to make gripping the terminal portions of rope segments 10 and 11 easier for the purpose of adjusting the fit of girth loop 36 and for preventing the terminal portions of rope segments 10 and 11 from slipping back through respective adjustment means 40 and 44. Rope segment stops 42 and 46 can be any device that aids in gripping rope segments 10 and 11. Acceptable rope segment stops are terminal back splices, knots, handles and grips.

The adjustable leash controlled strain reducing rope animal harness of the present invention is adjustable and can be made to fit all types of animals. Specifically, by adjusting the length of top connecting line 18, shoulder loop 22, bottom connecting line 26 and girth loop 36, as well as the type of rope 9, a harness for use on an animal as small as a hamster or as large as a horse or cow can be made. In general, for the harness to fit properly, the ratio of the length of shoulder loop 22, measured as the distance from second rope locking means 20 to third rope locking means 24, to the length of girth loop 36, measured as the distance from fourth rope locking means 34 to ring 38 is about 0.5:1 to 1:0.5, preferably about 0.75:1 to 1:0.75 and most preferably about 0.9:1 to 1:0.9. The ratio of shoulder loop 22 to bottom connecting line 26, measured as the distance from third rope locking means 24 to fourth rope locking means 34 is about 0.25:1 to 1:0.25, preferably about 0.5:1 to 1:0.5 and most preferably about 0.75:1 to 1:0.75. The ratio of girth loop 36 to bottom connecting line 26 is about 0.25:1 to 1:0.25, preferably about 0.5:1 to 1:0.5 and most preferably about 0.75:1 to 1:0.75. The length of top connecting line 18, as measured from first rope locking means 16 to second rope locking means 20, is not critical as long as it is a length sufficient to extend top connecting line 18 from second rope locking means 20 through ring 38 plus an acceptable distance to safely attach a leash to leash loop 14.

In order to use animal harness 8, it must be placed on an animal. FIG. 2 shows a perspective view of animal harness 8 as it would be placed on an animal. Leash loop 14, along with a portion of top connecting line 18, is passed through ring 38. In this orientation, leash 48 can be attached to animal harness 8 by attaching leash clip 50 to leash loop 14.

A side view of a dog wearing animal harness 8 is shown in FIG. 3. This side view shows how girth loop 36 is fitted behind the chest of the dog, around the dog's approximate waist. When tension is applied either by the dog pulling against leash 48, or by leash 48 being pulled, girth loop 36 cinches around the dog's midsection. This applies pressure to the dog's soft underbelly, which causes the dog to instinctively assume a submissive posture.

A quartering view of a dog wearing animal harness 8 is shown in FIG. 4. This view shows how shoulder loop 22 rides across the dog's shoulders and terminates in the lower mid chest area at third rope locking means 24.

An alternative adjustable leash controlled strain reducing rope animal harness of the present invention is shown in FIG. 5. An animal harness 52 of the present invention is formed from a length of rope 54, which is a twisted rope construction, with an approximate midpoint 56 from which a first rope segment 58 and a second rope segment 66 extend. A leash loop 68 is formed at the approximate midpoint 56 of the rope 54 and is closed with a first seizing 70 which is a binding or fastening together of two ropes, or parts of the same rope, by a number of longitudinal and transverse turns of a string, thread or twine. The first rope segment 58 and the second rope segment 66 are joined together by the first seizing 70 to form a top connecting line 72 which terminates at a second rope seizing 76. Additional seizings 74 may be used as required to hold top connecting line 72 together. A shoulder loop 78 is defined by the second rope seizing 76, a portion of the first rope segment 58, a portion of the second rope segment 66 and a third rope seizing 80. The first rope segment 58 and the second rope segment 66 are joined together by the third rope seizing 80 to form a bottom connecting line 98 which terminates at a fourth rope seizing 84. Additional seizings 82 may be used as required to hold bottom connecting line 98 together. A girth loop 100, designed to encompass a portion of an animal's body just behind the animal's chest, is defined by the fourth rope seizing 84, a portion of the first rope segment 58, a portion of the second rope segment 66 and a ring 102. A portion of the first rope segment 58 passes through the ring 102 and is attached to the portion of the first rope segment 58 in the girth loop 100 using a first adjustment slide 104 to form a first rope segment adjustment loop 106. A portion of the second rope segment 66 passes through the ring 102 and is attached to the portion of the second rope segment 66 in the girth loop 100 using a second adjustment slide 110 to form a second rope segment adjustment loop 112. A portion of the first rope segment 58 extends from the first adjustment slide 104 and is terminated by a first rope segment handle 108. A portion of the second rope segment 66 extends from the second adjustment slide 112 and is terminated by a second rope segment handle 114.

The present invention is also directed to a method of restraining an animal. The method for restraining an animal includes placing the above-described animal harness on the animal such that the girth loop encompasses the animal's torso, just behind the chest of the animal. The animal's head is placed through the shoulder loop and the leash loop and a portion of the top connecting line are passed through the ring. A leash is attached to the leash loop. When the leash is pulled, the girth loop tightens around the abdomen of the animal which produces an instinctive submissive response and the animal ceases to pull against the leash.

The invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

I claim:
1. An animal harness comprising:
   a length of rope with an approximate midpoint;
   a first rope segment and a second rope segment extending from the midpoint;
   a leash loop formed at the midpoint by locking the first rope segment and the second rope segment together by a first rope locking means;
   a top connecting line comprising a first portion of the first rope segment and a first portion of the second rope segment, originating at said first rope locking means and terminating at a second rope locking means;
   a shoulder loop defined by said second rope locking means, a second portion of the first rope segment, a second portion of the second rope segment and a third rope locking means;
   a bottom connecting line comprising a third portion of the first rope segment and a third portion of the second rope segment, originating at said third rope locking means and terminating at a fourth rope locking means;
   a girth loop, defined by said fourth rope locking means, a fourth portion of the first rope segment, a fourth portion of the second rope segment and a ring;
   a first adjustment loop defined by a fifth portion of the first rope segment which is passed through the ring and is attached to a portion of the fourth portion of the first rope segment using a first adjustment means;
   a second adjustment loop defined by a fifth portion of the second rope segment which is passed through the ring and is attached to a portion of the fourth portion of the second rope segment using a second adjustment means;
   a sixth portion of the first rope segment extending from said first adjustment means being terminated by a first rope stop; and
   a sixth portion of the second rope segment extending from the second adjustment means being terminated by a second rope stop.
2. The animal harness as claimed in claim 1 wherein a leash is attached to said leash loop.
3. The animal harness as claimed in claim 1 wherein a leash loop sleeve is placed over the leash loop.
4. The animal harness as claimed in claim 1 wherein the rope is a rope construction selected from the group consisting of hollow braid, braid-on-braid, solid braid and laid construction.
5. The animal harness as claimed in claim 4 wherein the rope is a hollow braid construction of 8, 12, or 16 carrier.
6. The animal harness as claimed in claim 1 wherein the rope material is selected from the group consisting of cotton, hemp, manila, sisal, wool, filament polypropylene, multifilament polypropylene, filament polyester, polyester, polyamide, polyethylene, aramid fiber, polymetaphenylene diamine fiber, and polyimide matrix fiber.
7. The animal harness as claimed in claim 1 wherein said first rope locking means, said second rope locking means, said third rope locking means and said fourth rope locking means are selected from the group consisting of a termination back splice, a hard lock splice, knots, sewing, stitching, seizing, clamping and buckling.
8. The animal harness as claimed in claim 1 wherein the rope is a hollow braid construction and said top connecting line and said bottom connecting line are constructed by passing one rope segment through another rope segment.
9. The animal harness as claimed in claim 1 wherein the ring is selected from the group consisting of an O ring, a D ring or a continuous loop of rope.
10. The animal harness as claimed in claim 1 wherein said first rope segment stop and said second rope segment stop are selected from the group consisting of a terminal back splice, knots, handles and grips.
11. The animal harness as claimed in claim 1 wherein the ratio of the length of said shoulder loop to the length of said girth loop is about 0.5:1 to 1:0.5; the ratio of the length of said shoulder loop to the length of said bottom connecting line is about 0.25:1 to 1:0.25; and the ratio of the length of said girth loop to the length of said bottom connecting line is about 0.25:1 to 1:0.25.
12. The animal harness as claimed in claim 2 used to restrain a quadruped animal.
13. The animal harness as claimed in claim 12 used to restrain a quadruped animal selected from the group consisting of members of the canis genus, members of the family felidae, members of the family leporidae, members of the family equidae, members of the family ursidae, members of the family camelidae, members of the family bovidae and pot belly pigs.
14. An adjustable leash controlled strain reducing animal harness comprised of:
   a length of hollow braid rope with an approximate midpoint;
   a first rope segment and a second rope segment extending from the midpoint;
   a leash loop formed at the midpoint, which is closed with a first hard lock back splice;
   a top connecting line formed by passing a first portion of the first rope segment through the center of a first portion of the second rope segment, said top connecting line extending from said first hard lock back splice to a second hard lock back splice;
   a shoulder loop defined by said second hard lock back splice, a second portion of the first rope segment, a second portion of the second rope segment and a third hard lock back splice;
   a bottom connecting line formed by a third portion of the second rope segment being passed through the center of a third portion of the first rope segment, said bottom connecting line extending from said third hard lock back splice to a fourth hard lock back splice;
   a girth loop defined by said fourth hard lock back splice, a fourth portion of the first rope segment, a fourth portion of the second rope segment and a D ring, the fourth portion of the first rope segment and the fourth portion of the second rope segment passing through the D ring;

a first rope segment adjustment loop comprising a fifth portion of the first rope segment extending from the D ring and passing through the fourth portion of the first rope segment via a first back splice adjustment;

a second rope segment adjustment loop comprising a fifth portion of the second rope segment extending from the D ring and passing through the fourth portion of the second rope segment via a second back splice adjustment;

a sixth portion of the first rope segment extending from the first back splice adjustment terminated by a first terminal back splice; and a sixth portion of the second rope segment extending from the second back splice adjustment terminated by a second terminal back splice.

15. The animal harness as claimed in claim 14 wherein a leash is attached to said leash loop.

16. The animal harness as claimed in claim 14 wherein a leash loop sleeve is placed over the leash loop.

17. The animal harness as claimed in claim 14 wherein the ratio of the length of said shoulder loop to the length of said girth loop is about 0.5:1 to 1:0.5; the ratio of the length of said shoulder loop to the length of said bottom connecting line is about 0.25:1 to 1:0.25; and the ratio of the length of said girth loop to the length of said bottom connecting line is about 0.25:1 to 1:0.25.

18. The animal harness as claimed in claim 15 used to restrain a quadruped animal.

19. The animal harness as claimed in claim 18 wherein the quadruped animal is a dog or a cat.

20. A method of restraining a quadruped animal comprising the steps of:

fitting on the animal a harness comprised of:

a length of rope with an approximate midpoint;

a first rope segment and a second rope segment extending from the midpoint;

a leash loop formed at the midpoint, which is closed by a first rope locking means, with a leash attached thereto;

a top connecting line comprising a first portion of the first rope segment and a first portion of the second rope segment, originating at said first rope locking means and terminating at a second rope locking means;

a shoulder loop defined by said second rope locking means, a second portion of the first rope segment, a second portion of the second rope segment and a third rope locking means;

a bottom connecting line comprising a third portion of the first rope segment and a third portion of the second rope segment, originating at said third rope locking means and terminating at a fourth rope locking means;

a girth loop, defined by said fourth rope locking means, a fourth portion of the first rope segment, a fourth portion of the second rope segment and a ring, wherein said girth loop encompasses the animal's body, just behind the animal's chest at an approximate waistline;

a first rope segment adjustment loop defined by a fifth portion of the first rope segment which is passed through the ring and is attached to a portion of the fourth portion of the first rope segment using a first adjustment means;

a second rope segment adjustment loop defined by a fifth portion of the second rope segment which is passed through the ring and is attached to a portion of the fourth portion of the second rope segment using a second adjustment means;

a sixth portion of the first rope segment extending from said first adjustment means being terminated by a first rope segment stop; and a sixth portion of the second rope segment extending from the second adjustment means being terminated by a second rope segment stop;

wherein said harness is fitted by placing the animal's head through the shoulder loop;

passing the leash loop and a portion of the top connecting line through the ring;

tightening said girth loop around the animal's abdomen;

applying tension to the leash such that the girth loop cinches around the abdomen of the animal producing an instinctive submissive response by the animal causing the animal to cease pulling against the leash.

\* \* \* \* \*